United States Patent
Yutani

(10) Patent No.: US 10,069,925 B2
(45) Date of Patent: Sep. 4, 2018

(54) SERVER DEVICE AND INFORMATION PROCESSING METHOD

(71) Applicant: SONY CORPORATION, Tokyo (JP)

(72) Inventor: Tetsuo Yutani, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 402 days.

(21) Appl. No.: 14/549,762

(22) Filed: Nov. 21, 2014

(65) Prior Publication Data

US 2015/0156269 A1 Jun. 4, 2015

(30) Foreign Application Priority Data

Dec. 4, 2013 (JP) .................................. 2013-251511

(51) Int. Cl.
  *G06F 15/16* (2006.01)
  *H04L 29/08* (2006.01)

(52) U.S. Cl.
  CPC .............. *H04L 67/22* (2013.01); *H04L 67/02* (2013.01); *H04L 67/18* (2013.01); *H04L 67/306* (2013.01)

(58) Field of Classification Search
  CPC ............. H04L 41/0813; H04L 41/0823; H04L 47/823; H04L 47/783; H04L 67/1023; H04L 67/22; H04L 67/02; H04L 67/18; H04L 67/306; G05N 7/005; G06Q 10/10
  USPC ......................................... 709/203, 219, 205
  See application file for complete search history.

(56) References Cited

U.S. PATENT DOCUMENTS

| | | | |
|---|---|---|---|
| 7,133,896 B2 * | 11/2006 | Ogdon | H04L 12/1813 709/205 |
| 7,634,484 B2 * | 12/2009 | Murata | G06F 17/30038 |
| 7,756,880 B2 * | 7/2010 | Sighart | G06F 17/30867 707/751 |
| 7,818,415 B2 * | 10/2010 | Jhanji | G06Q 30/0259 709/207 |
| 7,925,782 B2 * | 4/2011 | Sivasubramanian | H04L 29/12132 709/203 |
| 8,255,456 B2 * | 8/2012 | Sundarrajan | H04L 67/28 709/203 |
| 8,281,035 B2 * | 10/2012 | Farber | G06F 9/505 709/219 |
| 8,356,074 B1 * | 1/2013 | Ehrlich | H04L 67/322 709/203 |
| 8,516,193 B1 * | 8/2013 | Clinton | H04L 67/1097 706/47 |
| 8,799,759 B2 * | 8/2014 | Falkenberg | G06F 17/30899 709/203 |
| 8,825,740 B2 * | 9/2014 | Catorcini | G06F 17/3089 707/728 |
| 8,954,492 B1 * | 2/2015 | Lowell, Jr. | H04L 45/02 370/428 |

(Continued)

FOREIGN PATENT DOCUMENTS

JP  2004-280405 A  10/2004

*Primary Examiner* — Thu Ha Nguyen

(74) *Attorney, Agent, or Firm* — Chip Law Group

(57) ABSTRACT

A server device includes an acquisition unit which acquires contextual information of a client device; a Web site specification unit which specifies a Web site according to the contextual information; a temporary storage unit which temporarily stores Web content that is acquired from the Web site; a communication unit which transmits the Web content that is stored in the temporary storage unit to the client device; and a control unit which controls operations of the entire server device.

9 Claims, 12 Drawing Sheets

(56) References Cited

U.S. PATENT DOCUMENTS

| | | | |
|---|---|---|---|
| 2001/0034762 A1* | 10/2001 | Jacobs | G06Q 10/107 709/204 |
| 2003/0061278 A1* | 3/2003 | Agarwalla | G06F 17/30902 709/203 |
| 2003/0233423 A1* | 12/2003 | Dilley | H04L 29/06 709/214 |
| 2004/0230572 A1* | 11/2004 | Omoigui | G06F 17/30528 |
| 2005/0286466 A1* | 12/2005 | Tagg | H04L 12/2856 370/329 |
| 2006/0089157 A1* | 4/2006 | Casey | H04L 67/04 455/456.3 |
| 2006/0294223 A1* | 12/2006 | Glasgow | H04L 67/2847 709/224 |
| 2008/0082542 A1* | 4/2008 | Cohen | G06Q 10/00 |
| 2010/0281105 A1* | 11/2010 | Sebastian | H04L 12/1859 709/203 |
| 2010/0306249 A1* | 12/2010 | Hill | G06F 17/30867 707/769 |
| 2013/0073400 A1* | 3/2013 | Heath | G06Q 30/02 705/14.73 |
| 2013/0080420 A1* | 3/2013 | Taylor | H04L 67/02 707/722 |
| 2014/0068010 A1* | 3/2014 | Nicholson | B60K 35/00 709/219 |
| 2014/0068713 A1* | 3/2014 | Nicholson | H04W 12/06 726/3 |
| 2014/0201331 A1* | 7/2014 | Kershaw | H04W 4/001 709/219 |
| 2014/0258390 A1* | 9/2014 | Annamalaisami | G06Q 10/10 709/203 |
| 2015/0032803 A1* | 1/2015 | Graham-Cumming | H04L 29/06047 709/203 |
| 2015/0120722 A1* | 4/2015 | Martín Martínez | G06F 17/30867 707/733 |
| 2015/0120821 A1* | 4/2015 | Bendell | H04L 67/02 709/203 |
| 2015/0170072 A1* | 6/2015 | Grant | G06Q 10/067 705/7.36 |
| 2015/0180968 A1* | 6/2015 | Schapira | H04L 67/2804 709/203 |
| 2015/0186390 A1* | 7/2015 | Katic | H04L 67/2842 709/203 |
| 2015/0188994 A1* | 7/2015 | Marshall | H04L 67/10 709/203 |
| 2015/0295987 A1* | 10/2015 | Finocchiaro | H04N 21/222 709/203 |
| 2015/0358397 A1* | 12/2015 | Wiseman | H04L 67/02 709/201 |
| 2016/0337902 A1* | 11/2016 | Hahn | H04W 28/08 |

* cited by examiner

SERVER DEVICE AND INFORMATION PROCESSING METHOD

CROSS REFERENCE TO RELATED APPLICATIONS

This application claims the benefit of Japanese Priority Patent Application JP 2013-251511 filed Dec. 4, 2013, the entire contents of which are incorporated herein by reference.

BACKGROUND

The present technology relates to a server device and an information processing method. In particular, the present technology relates to a server device and an information processing method which are capable of quickly presenting desired Web content.

With the wide adoption of the Internet in recent years, a system has been devised in which a server device provides Web content (a Web page) formed of HyperText Markup Language (HTML) format files according to requests from a client device. In regard to the system, many years have been spent on research into reducing the time which is necessary for providing the Web content to the client device; that is, the time from the client device transmitting a request until the time at which the Web content is displayed.

The present applicant has disclosed technology relating to a cache server which caches a Web site corresponding to the preferences of the user (for example, refer to Japanese Unexamined Patent Application Publication No. 2004-280405). Using the technology disclosed in Japanese Unexamined Patent Application Publication No. 2004-280405, by caching Web content corresponding to the preferences of the user, it is possible to prefetch link destinations in a Web page being displayed by a Web browser, and to display target Web content in a short time when the user clicks a link.

SUMMARY

However, there is a case in which, when there is a plurality of links in the Web page, it is difficult to prefetch all of the link destinations. In this case, even if all the link destinations are prefetched, it takes time to perform the prefetching.

Therefore, the Web page which the user selects may not necessarily be prefetched, and the prefetching hit rate is not necessarily high. When the prefetch is not a hit, the display of the Web page that is selected by the user is delayed; thus, there is a demand to reliably perform the prefetching and quickly display the desired Web content. It is desirable to quickly present the desired Web content.

According to an embodiment of the present technology, there is provided a server device which includes an acquisition unit which acquires contextual information of a client device; a Web site specification unit which specifies a Web site according to the contextual information; a temporary storage unit which temporarily stores Web content that is acquired from the Web site; a communication unit which transmits the Web content that is stored in the temporary storage unit to the client device; and a control unit which controls operations of the entire server device.

When the control unit identifies that the client device is moving according to the contextual information, the control unit may disallow transmission of the Web content to the client device by the communication unit.

The contextual information may include at least one of positional information indicating a position of the client device, acceleration information indicating acceleration of the client device, and behavioral information indicating behavior of a user in possession of the client device. The contextual information may include at least information indicating one of date and time, time of day, and weekday.

The acquisition unit may acquire a recommendation list of Web sites corresponding to preferences of a user in advance, and the web site specification unit may specify the Web sites from the recommendation list according to a user profile.

The control unit may control the server device such that, when the Web content that is requested by the client device is not stored in the temporary storage unit, the Web content is acquired from the Web site that provides the Web content, stored in the temporary storage unit, and returned to the client device via the communication unit.

The control unit may render the Web content that is stored in the temporary storage unit, and the communication unit may transmit results of the rendering to the client device.

The control unit may control the server device such that, when updated information of the Web site is received from the Web server device via the communication unit, the Web content of the Web site is acquired, compared with the Web content stored in the temporary storage unit, and only an updated portion of the Web content is transmitted to the client device.

Link information indicating a location at which the Web content is stored may be arranged by the user in the temporary storage unit, and, when the Web content which is provided by the Web site which is specified according to the contextual information of a predetermined user is already stored in the temporary storage unit, the control unit may be configured to not acquire the Web content from the Web site, and to cause the temporary storage unit to store the link information, associated with the user, indicating the storage location at which the Web content is stored.

The server device may be an independent device, and may be an internal block which configures a single device. An information processing method according to an embodiment of the present technology is an information processing method which corresponds to the server device according to an embodiment of the technology described above.

In the server device and the information processing method of an embodiment of the present technology, contextual information of a client device is acquired; a Web site is specified according to the contextual information; Web content that is acquired from the Web site is temporarily stored in a temporary storage unit; and the Web content that is stored in the temporary storage unit is transmitted to the client device.

According to the embodiments of the present technology, it is possible to quickly present the desired Web content. Note that, the embodiments of the present disclosure are not necessarily limited to the effects described above, and may exhibit any of the effects described in the present disclosure.

DETAILED DESCRIPTION OF EMBODIMENTS

Hereinafter, description will be given of an embodiment of the present technology with reference to the drawings.

The description will be given in the following order:
1. System Configuration
2. Flow of Intermediate Server Device Processes
3. Flow of Client Device Processes
4. Modification Example
5. Specific Practical Example
6. Configuration of Computer 1. System Configuration Configuration of Communication System FIG. 1 is a diagram illustrating an embodiment of a communication system to which the present technology is applied.

Figure 1:
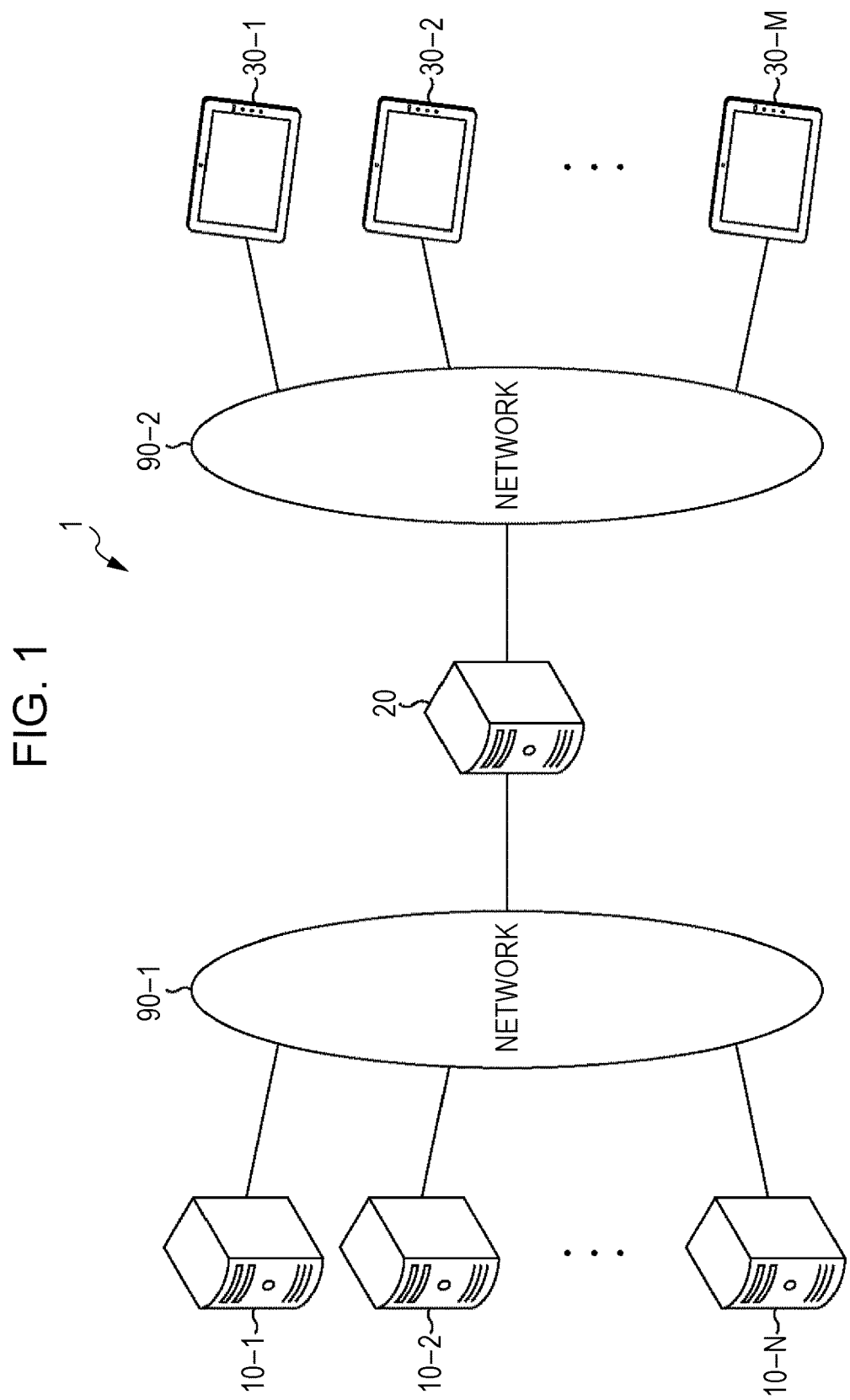
FIG. 1 is a diagram illustrating an embodiment of a communication system to which the present technology is applied.

As illustrated in FIG. 1, a communication system 1 is configured to include Web server devices 10-1 to 10-N (where N is an integer equal to or greater than 1), an intermediate server device 20, and client devices 30-1 to 30-M (where N is an integer equal to or greater than 1). The intermediate server device 20 and the Web server devices 10-1 to 10-N are connected to each other via a network 90-1. The intermediate server device 20 and the client devices 30-1 to 30-M are connected to each other via a network 90-2.

The Web server devices 10-1 to 10-N are servers solely for providing the Web site (origin servers). The Web server devices 10-1 to 10-N provide Web content which is published on the Web site to the intermediate server device 20 via the network 90-1. Note that, the Web content is configured of a resource such as HyperText Markup Language (HTML) documents and image data. For example, a Web page such as news, weather forecasting, and sports is provided.

The client device 30-1 is an electrical device such as a tablet terminal, a smart phone, a mobile telephone, a wearable computer of an eyeglass-type, a wristwatch-type or the like, a laptop personal computer, or a personal computer, for example. The client device 30-1 acquires the contextual information and transmits the contextual information to the intermediate server device 20 via the network 90-2.

Here, the term "contextual information" refers to information indicating the status of the client device 30-1 being used by the user. For example, contextual information includes positional information indicating the position of the client device 30-1, acceleration information indicating the acceleration of the client device 30-1, behavioral information indicating the behavior of the user in possession of the client device 30-1, and the like. In addition to this information, information indicating the date and time, the time of day, the weekday and the like can also be the contextual information. Note that, using the positional information, the information relating to time can take the time difference for each location into consideration.

The intermediate server device 20 receives the contextual information from the client device 30-1 via the network 90-2. The intermediate server device 20 specifies the Web site which is provided by the Web server devices 10-1 to 10-N according to the contextual information from the client device 30-1, acquires the Web content from the Web server device 10 which provides the specified Web site, and temporarily stores the Web content. The intermediate server device 20 transmits the temporarily stored Web content to the client device 30-1.

The client device 30-1 receives the Web content that is transmitted from the intermediate server device 20 via the network 90-2. In the client device 30-1, the Web content from the intermediate server device 20 is displayed on a display unit by a Web browser.

In the same manner as the client device 30-1, the client devices 30-2 to 30-M transmit contextual information to the intermediate server device 20, and thus receive the Web content from the intermediate server device 20 according to the contextual information, and the Web content is displayed on the display unit by the Web browser.

Note that, in FIG. 1, to facilitate description, the network 90-1 and the network 90-2 are described as different networks; however, for example, these may be configured to be the same network such as the Internet. When any of the client devices 30-1 to 30-M is a mobile communication terminal such as a tablet terminal, a smart phone or a mobile telephone, the network 90-2 includes a mobile communication network such as a mobile telephone communication network, and the mobile communication terminal accesses the Internet via the mobile communication network.

In the description hereinafter, when it is not particularly necessary to distinguish the Web server devices 10-1 to 10-N, they will be referred to as the Web server device 10, and when it is not particularly necessary to distinguish the client devices 30-1 to 30-M, they will be referred to as the client device 30. Furthermore, when it is not necessary to distinguish the network 90-1 and the network 90-2, they will be referred to as the network 90.

Configuration of Intermediate Server Device

Figure 2:
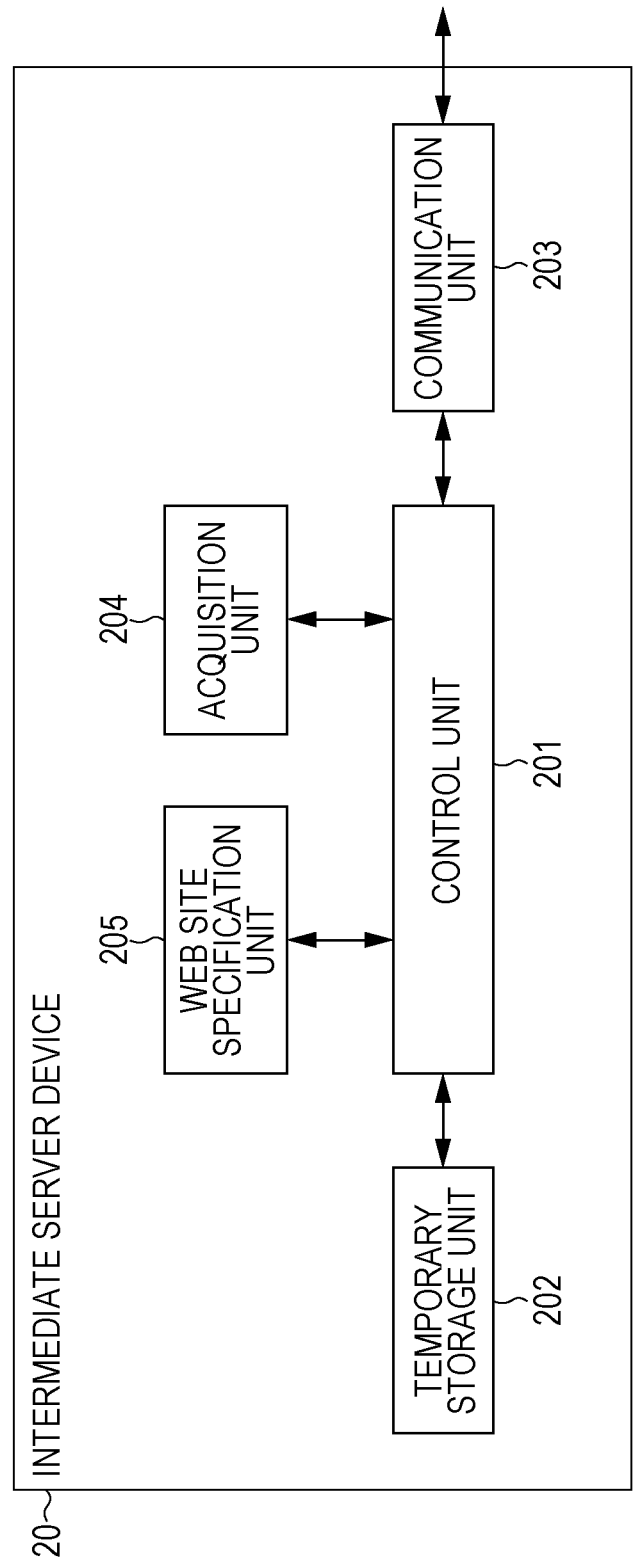
FIG. 2 is a diagram illustrating an embodiment of a server device to which the present technology is applied.

FIG. 2 is a diagram illustrating an embodiment of a server device to which the present technology is applied.

As illustrated in FIG. 2, the intermediate server device 20 is configured to include a control unit 201, a temporary storage unit 202, a communication unit 203, an acquisition unit 204, and a web site specification unit 205.

The control unit 201 controls the operations of the elements of the intermediate server device 20. According to the control from the control unit 201, the temporary storage unit 202 temporarily stores various data.

According to the control from the control unit 201, the communication unit 203 carries out the exchange of the various data between the Web server device 10, other server devices (not shown), and the client device 30 via the network 90.

According to the control from the control unit 201, the acquisition unit 204 controls the communication unit 203 to acquire the various data from the Web server device 10, the other server devices, and the client device 30 which are connected to the network 90. The contextual information, the Web content, a recommendation list, or profile information is acquired as the various information.

As described above, the contextual information includes information relating to the place or the time of usage of the client device 30. The recommendation list is a list of Web sites corresponding to the preferences of the user. The profile information is information which indicates the preferences and the behavioral history of the user.

The web site specification unit 205 specifies the Web site according to the contextual information which is acquired by the acquisition unit 204. The web site specification unit 205 specifies the Web site from the recommendation list according to the contextual information which is acquired from the acquisition unit 204, and the profile information.

The acquisition unit 204 controls the communication unit 203 to access the Web server device 10, which provides the Web site specified by the web site specification unit 205, via the network 90, and acquires the Web content.

According to the control from the control unit 201, the temporary storage unit 202 temporarily stores the Web content which is acquired by the acquisition unit 204. Note that, the link information indicating the location at which the Web content is stored is arranged by the user in the temporary storage unit 202. When the Web content which is provided by the Web site which is specified according to the contextual information of a predetermined user is stored in the temporary storage unit 202, the control unit 201 does not acquire the Web content from the Web site, and causes the temporary storage unit 202 to store the link information, associated with the user, indicating the storage location at which the Web content is stored.

In the intermediate server device 20 which is configured as described above, the Web site provided by the Web server device 10 is specified according to the contextual information transmitted from the client device 30, the Web content of the specified Web site is temporarily stored and is transmitted to the client device 30. Note that, in the network 90, since the intermediate server device 20 is disposed closer to the client device 30 than the Web server device 10, the intermediate server device 20 can be said to be a so-called edge server.

Configuration of Client Device

Figure 3:
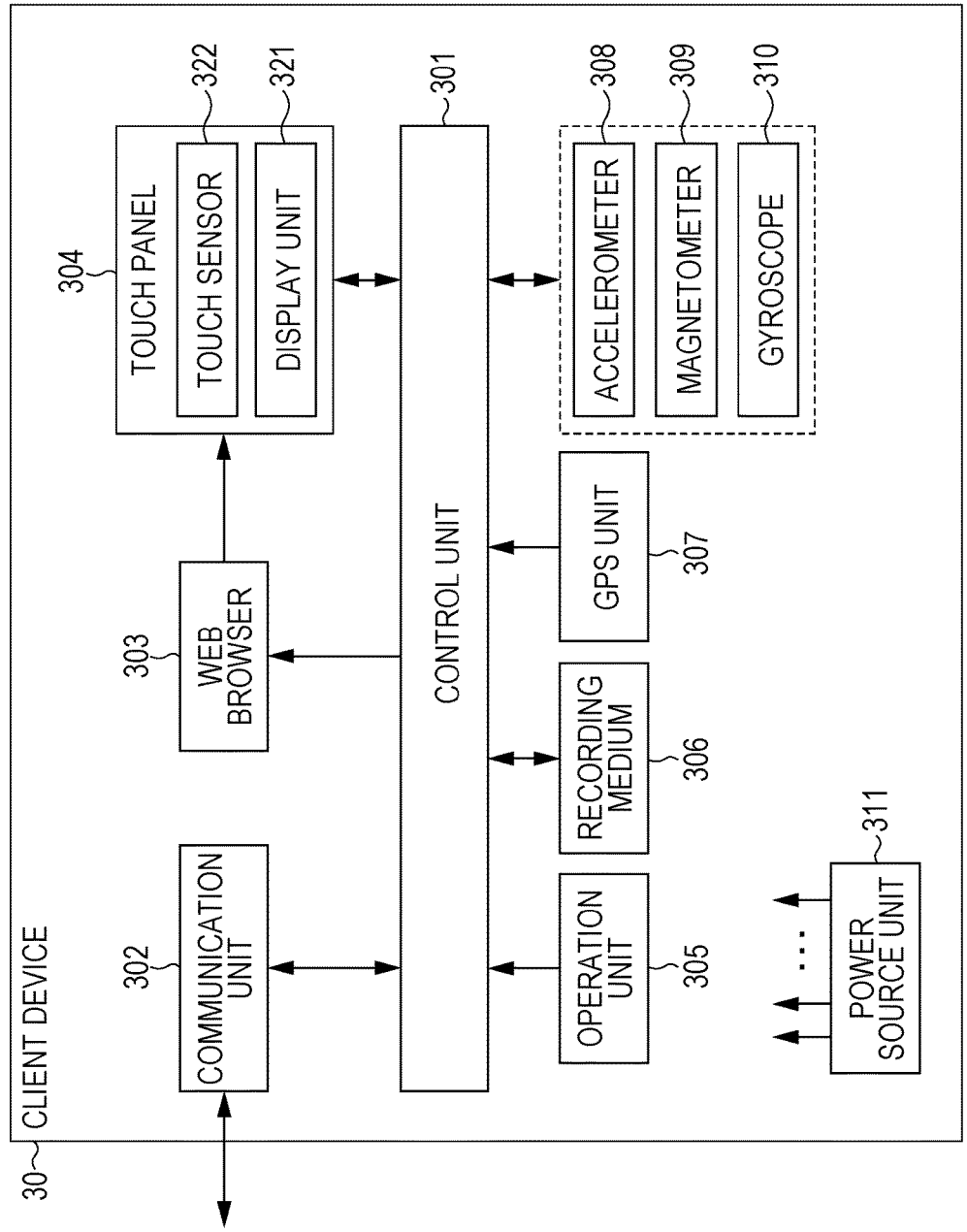
FIG. 3 is a diagram illustrating an embodiment of a client device to which the present technology is applied.

FIG. 3 is a diagram illustrating an embodiment of a client device to which the present technology is applied.

As illustrated in FIG. 3, the client device 30 is configured to include a control unit 301, a communication unit 302, a Web browser 303, a touch panel 304, an operation unit 305, a recording medium 306, a GPS unit 307, an accelerometer 308, a magnetometer 309, a gyroscope 310, and a power source unit 311.

The control unit 301 controls the operations of the elements of the client device 30.

According to the control from the control unit 301, the communication unit 302 carries out the exchange of the various data between the intermediate server device 20, and the other server devices (not shown) via the network 90. According to the control from the control unit 301, the communication unit 302 receives the Web content transmitted from the intermediate server device 20 and stores the Web content on the recording medium 306.

The Web browser 303 is a Web browser application for viewing the Web content, and displays the Web content which is stored in the recording medium 306 on a display unit 321 of the touch panel 304 according to the control from the control unit 301.

The touch panel 304 is configured to include the display unit 321, and a touch sensor 322 which is superposed on the screen of the display unit 321. The display unit 321 is configured of a Liquid Crystal Display (LCD), an Organic Electroluminescence Display (GELD), or the like, and displays the various information according to the control from the control unit 301.

The touch sensor 322 detects an input operation performed by the user in relation to the touch panel 304 in addition to the position on the touch panel 304 of the location at which the operation is performed, and supplies the detection signal to the control unit 301. The control unit 301 controls the operations of the elements of the client device 30 according to the detection signal from the touch sensor 322.

The operation unit 305 is a physical button or the like provided on the client device 30, and supplies the operation signal to the control unit 301 according to the operation of the user. The control unit 301 controls the operations of the elements of the client device 30 according to the operation signal from the operation unit 305.

The recording medium 306 is configured of, for example, a removable memory card or a Hard Disk Drive (HDD). According to the control from the control unit 301, the recording medium 306 stores the various data.

The GPS unit 307 has a Global Positioning System (GPS) function, and acquires the present position of the client device 30 by receiving signals from GPS satellites (not shown) according to the control from the control unit 301.

According to the control from the control unit 301, the accelerometer 308 detects the acceleration of the client device 30. According to the control from the control unit 301, the magnetometer 309 detects terrestrial magnetism. According to the control from the control unit 301, the gyroscope 310 detects the rotational angle of the client device 30.

Using the positional information from the GPS unit 307 and the detection results from the various sensors, the control unit 301 performs a predetermined operation which predicts the behavior of the user in possession of the client device 30, and acquires the behavioral information obtained as a result of the operation. Here, for example, the behavior of the user in possession of the client device 30 is predicted according to the present position indicated by the positional information from the GPS unit 307, the acceleration indicated by the acceleration information from the accelerometer 308, the orientation indicated by the orientation information obtained from the detection results of the accelerometer 308 and the magnetometer 309, the rotational angle indicated by the rotational angle information from the gyroscope 310, and the like.

Note that, the accelerometer 308 to the gyroscope 310 are examples of sensors which are provided in the client device 30, and other sensors may be provided. When performing the operation which predicts the behavior of the user, it is possible to use the detection results from the other sensors. Basically, the behavior of the user may be predicted using the positional information from the GPS unit 307 and the detection results from the various sensors, and the method employed to achieve the operation is arbitrary. By transmitting the information such as the positional information, the detection results of the sensors to the intermediate server device 20, the intermediate server device 20 may perform an operation which predicts the behavior of the user.

The control unit 301 controls the communication unit 302 to transmit the contextual information, which includes at least one of the positional information from the GPS unit 307, the acceleration information from the accelerometer 308, and the behavioral information indicating the behavior of the user which is obtained from the results of the operation, to the intermediate server device 20 via the network 90.

Note that, the contextual information which is transmitted in this manner may include information indicating the date and time, the time of day, the weekday and the like, in addition to the orientation information obtained from the detection results of the accelerometer 308 and the magnetometer 309, and the information which is obtained from the other sensors such as the rotational angle information from the gyroscope 310.

The power source unit 311 supplies electrical power obtained from a storage battery or an external power source to the elements of the client device 30 including the control unit 301. In the client device 30 configured as described above, by transmitting the contextual information to the intermediate server device 20, the Web content according to the contextual information is transmitted from the intermediate server device 20; thus, the Web content is received and displayed.

Note that, in the client device 30, the control unit 301, the communication unit 302, the touch panel 304, the operation unit 305, the recording medium 306, the GPS unit 307, the accelerometer 308, the magnetometer 309, the gyroscope 310, and the power source unit 311 are configured as hardware. Meanwhile, in the client device 30, the Web browser 303 is realized using a program which is executed by a CPU (for example, a CPU 901 of FIG. 13).

2. Flow of Intermediate Server Device Processes

Next, description will be given of the flow of the processes executed by the intermediate server device 20 with reference to the flowcharts of FIGS. 4 to 7.

Web Content Distribution Process 1

First, description will be given of a Web content distribution process 1 which is executed by the intermediate server device 20, with reference to the flowchart of FIG. 4.

In step S101, the web site specification unit 205 specifies a Web site according to the contextual information. As described later with reference to the flowchart of FIG. 6, the contextual information is acquired from the client device 30 at a predetermined timing.

In step S102, the acquisition unit 204 controls the communication unit 203 to access the Web server device 10, which provides the Web site specified by the process of step S101, via the network 90, and acquires the Web content.

In step S103, according to the control from the control unit 201, the temporary storage unit 202 temporarily stores the Web content which is acquired by the acquisition unit 204. Accordingly, the Web content corresponding to the contextual information of the client device 30 is loaded in advance by the intermediate server device 20.

In step S104, the control unit 201 performs a rendering process on the Web content which is temporarily stored in the temporary storage unit 202 in the process of step S103. For example, in the rendering process, some or all of the processes of those which are executed by the rendering engine of the Web browser 303 of the client device 30 are executed.

Specifically, the HTML, the Cascading Style Sheets (CSS), and the JavaScript (registered trademark) are analyzed (parsed), and some or all of the processes of a process of converting to intermediate data, a process of also performing the layout rendering and resizing images to an actual size, an advanced compression process such as converting a portion of images to vectors, and a process of simplifying the style are executed. Accordingly, for example, when JavaScript (registered trademark) is denoted within the HTML document, by the intermediate server device 20 performing the rendering of the JavaScript (registered trademark), it becomes unnecessary for the client device 30 to analyze the JavaScript (registered trademark); thus, it is possible to display the Web content at high speed by reducing the load of analysis.

In step S105, according to the control from the control unit 201, the communication unit 203 transmits the Web content that is subjected to the rendering process of step S104 to the client device 30 via the network 90. Note that, in regard to the timing at which the Web content is transmitted to the client device 30, the Web content may be transmitted when there is a request from the client device 30, and may be transmitted at another timing. For example, the control unit 201 can be configured to transmit the Web content to the client device 30 when the location, the time, or the like of the client device 30 satisfy predetermined transmission conditions based on the contextual information from the client device 30. The transmission conditions will be described later in detail with reference to the flowchart of FIG. 7.

While it is favorable to execute the rendering process of step S104, there is a case in which the rendering process is not necessary depending on the practical form of the communication system 1; and, in this case, the Web content acquired from the Web server device 10 is transmitted as it is to the client device 30. In this case, the process of step S104 is skipped.

In step S106, the control unit 201 determines whether or not the Web site which is specified by the process of step S101 is updated. In the determination process, for example, the control unit 201 determines whether or not the Web site is updated based on updated information received as a notification from the Web server device 10 which provides each Web site. The control unit 201 may control the communication unit 203 to access the specific Web server device 10 and query the update status of the Web site.

In step S106, when the control unit 201 determines that the Web site is updated, the process returns to step S102. By repeating the processes of steps S102 to S105 described above, the updated Web content is acquired, subjected to a rendering process, and subsequently transmitted to the client device 30 via the network 90.

In step S106, when the control unit 201 determines that the Web site is not updated, the process proceeds to step S107. In step S107, the control unit 201 determines whether or not the user status is changed based on the contextual information. For example, the location of the user in possession of the client device 30, chronological elements such as the time of day or the weekday and the like are used as conditions for the determination. Note that, here, the client device 30 may determine whether or not the user status is changed and notify the intermediate server device 20 of the determination result.

In step S107, when it is determined that the user status is not changed, the process returns to step S106. By repeating the processes described above, when it is determined that the user status is changed in step S107, the process returns to step S101. Accordingly, in the process of step S101, the Web site is specified again according to the contextual information indicating the changed user status, the Web content of the Web site is acquired from the Web server device 10, temporarily stored, and transmitted to the client device 30.

The Web content distribution process 1 is described above. In the Web content distribution process 1, the Web site provided by the Web server device 10 is specified according to the contextual information transmitted from the client device 30, the Web content of the specified Web site is acquired and temporarily stored, and the temporarily stored Web content is transmitted to the client device 30.

In other words, in the intermediate server device 20, it is possible to prefetch and temporarily store the Web content with a high probability of being viewed by the user based on the contextual information of the user, and transmit the Web content to the client device 30; thus, in the client device 30, it is possible to quickly present the desired Web content.

Partial Update Process

Figure 4:
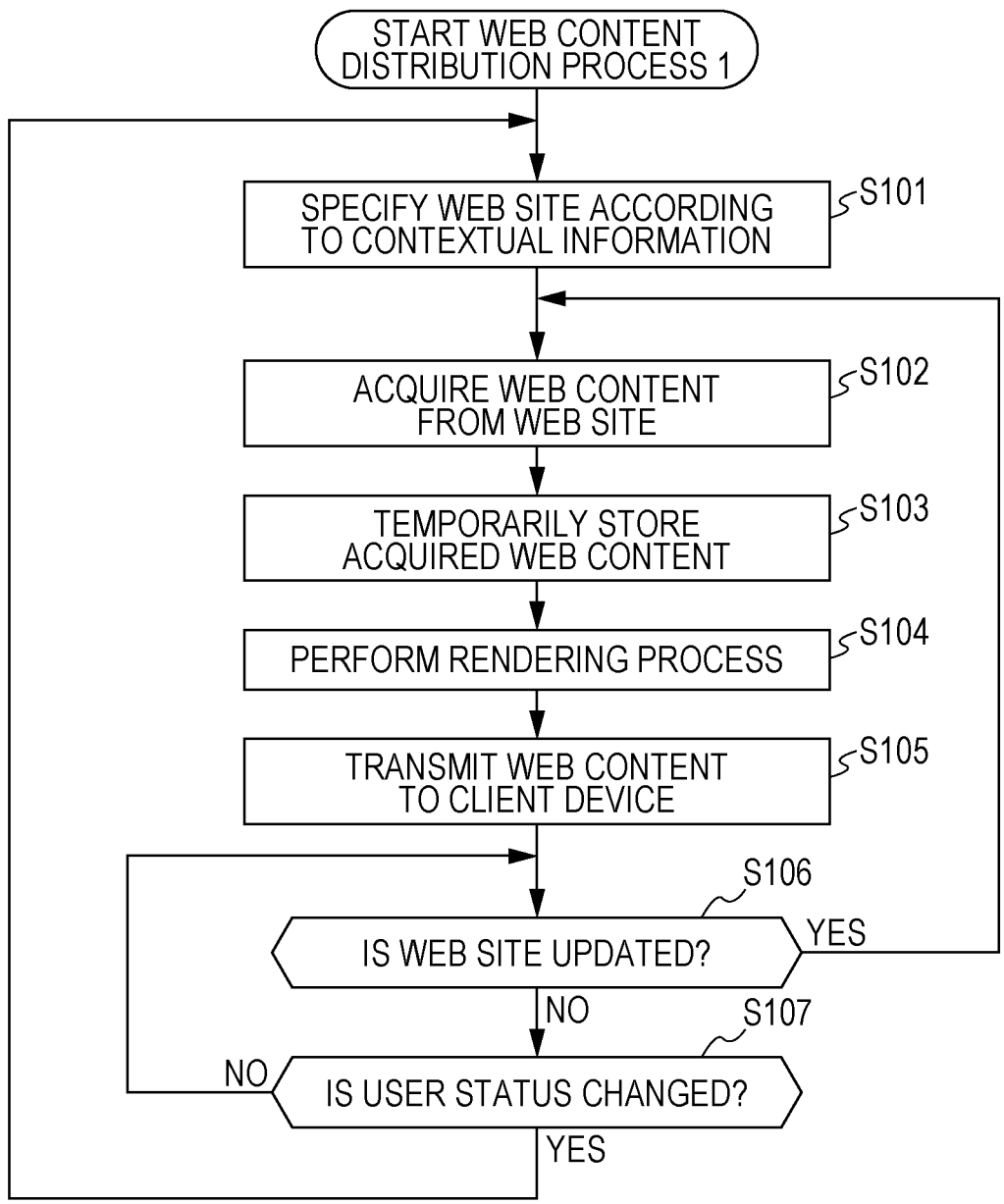
FIG. 4 is a flowchart illustrating Web content distribution process 1.

In the description given above of the flowchart of FIG. 4, transmitting all of the updated Web content to the client device 30 when the Web site is updated is described; however, in the case of a flash news bulletin in a news site, for example, there is a case in which only a portion of the Web content is updated, and in this case, updating all of the Web content is inefficient. Therefore, next, description will be given of a partial update process in which a portion of the Web content is updated.

Figure 5:
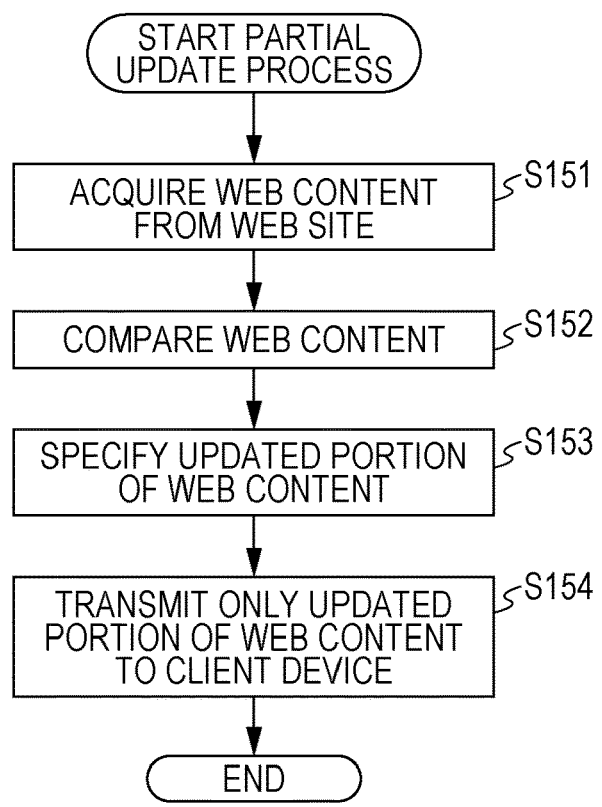
FIG. 5 is a flowchart illustrating a partial update process.

FIG. 5 is a flowchart illustrating a partial update process which is executed by the intermediate server device 20. In other words, in the determination process of step S106 of FIG. 4 described above, when the control unit 201 determines that the Web site is updated, the partial update process of FIG. 5 is the process which is executed instead of the processes of steps S102 to S105 of FIG. 4.

In step S151, the acquisition unit 204 controls the communication unit 203 to access the Web server device 10, which provides the specified Web site, via the network 90, and acquires the updated Web content.

In step S152, the control unit 201 compares the pre-update Web content which is stored in the temporary storage unit 202 with the updated Web content which is newly acquired by the process of step S151.

In step S153, the control unit 201 specifies the updated portion of the newly acquired Web content based on the comparison results obtained in the process of step S153.

In step S154, according to the control from the control unit 201, of the newly acquired Web content, the communication unit 203 transmits only the updated portion which is specified by the process of step S153 to the client device 30 via the network 90. When the process of S154 ends, the partial update process of FIG. 5 ends.

The partial update process is described above. In the partial update process, when the updated information of the Web site is received from the Web server device 10, the Web content of the Web site is acquired, compared with the Web content stored in the temporary storage unit 202, and only the updated portion of the Web content is transmitted to the client device 30.

Contextual Information Acquisition Process Next, description will be given of the contextual information acquisition process which is executed by the intermediate server device 20, with reference to the flowchart of FIG. 6.

In step S201, the control unit 201 determines whether or not it is time to acquire the contextual information. In the determination process of step S201, the process waits for the time to acquire the contextual information and then proceeds to step S202.

In step S202, the acquisition unit 204 controls the communication unit 203 to acquire the contextual information which is received as a notification from the client device 30 via the network 90.

When the process of step S202 ends, the process returns to step S201 and the process described above is repeated. Note that, in regard to the timing at which the contextual information is acquired, for example, a request for contextual information may be transmitted from the intermediate server device 20 to the client device 30, or alternatively, the notification timing of the contextual information may be managed at the client device 30 side and the notification carried out at that timing.

The contextual information acquisition process is described above. In the contextual information acquisition process, the contextual information which is received as a notification from the client device 30 is acquired by the intermediate server device 20 at a predetermined timing.

Web Content Transmission Determination Process

Figure 7:
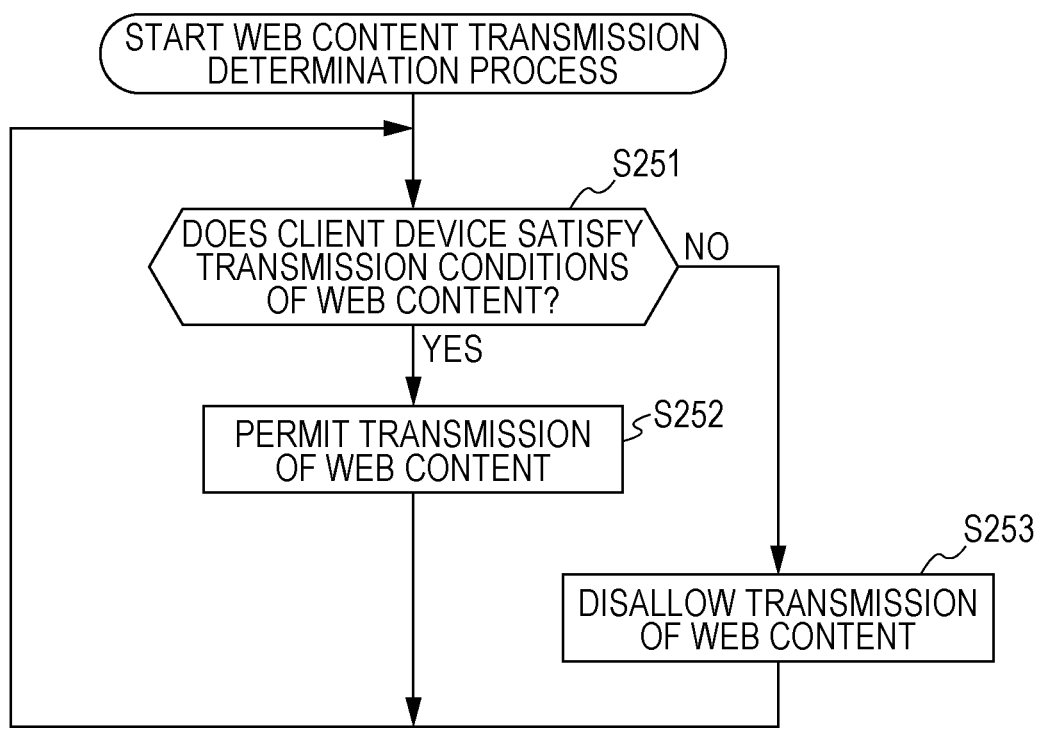
FIG. 7 is a flowchart illustrating a Web content transmission determination process.

Next, description will be given of the Web content transmission determination process which is executed by the intermediate server device 20, with reference to the flowchart of FIG. 7.

In step S251, the control unit 201 determines whether or not the client device 30 satisfies the predetermined transmission conditions of the Web content based on the contextual information.

Figure 6:
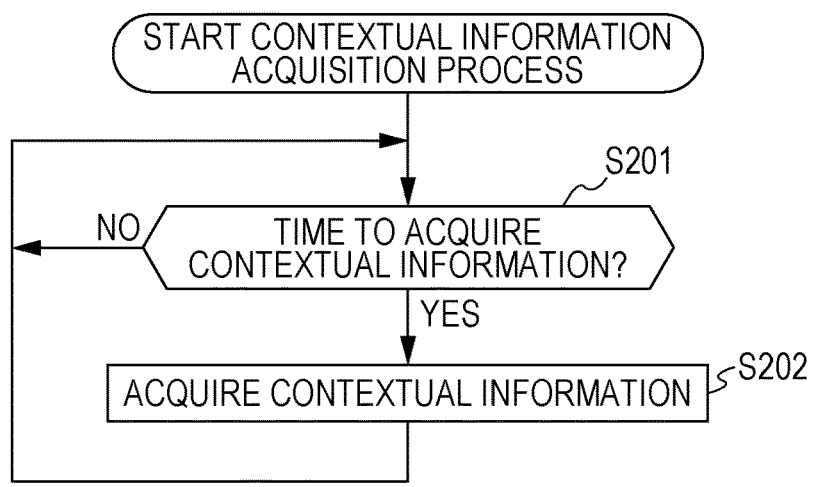
FIG. 6 is a flowchart illustrating a contextual information acquisition process.

The contextual information is acquired from the client device 30 at a predetermined timing by the contextual information acquisition process of FIG. 6 described above. It is possible to set whether or not the client device 30 is left at home in the early morning, whether or not the client device 30 is moving together with the user riding on a train during commuting hours, and the like, which is information obtained from the positional information and the acceleration information included in the contextual information, for example, as the predetermined transmission conditions.

In step S251, for example, when the transmission conditions of the Web content are determined to be satisfied such as when the user is at home in the early morning and the client device 30 is placed nearby, the process proceeds to step S252. In step S252, the control unit 201 permits the transmission of the Web content by the communication unit 203. For example, when the transmission of the Web content is permitted, the Web content is transmitted from the intermediate server device 20 to the client device 30 via the network 90 using a wireless Local Area Network (LAN) of the home of the user according to the process of step S105 of FIG. 4.

Meanwhile, in step S251, for example, when the transmission conditions of the Web content are determined not to be satisfied such as when the user is riding a train during commuting hours and is in possession of the client device 30, the process proceeds to step S253. In step S253, the control unit 201 disallows the transmission of the Web content by the communication unit 203. For example, when the transmission of the Web content is disallowed, the Web content is not transmitted unilaterally from the intermediate server device 20 to the client device 30. However, even in this case, for example, it is possible to transmit the Web content when there is a request from the client device 30, or to transmit a portion of the Web content when only a portion of the Web content is updated.

The Web content transmission determination process is described above. In the Web content transmission determination process, whether to permit or to disallow the transmission of the Web content is specified according to changes in the user status obtained from the contextual information. For example, when the user is at home in the early morning, it is possible to perform communication at high speed and safely using a wireless LAN (for example, Wi-Fi) which is connected to a fixed communication network (for example, an optical communication network or the like); thus, the intermediate server device 20 permits the transmission of the Web content and causes the Web content to be stored in the client device 30.

Meanwhile, for example, when the user is riding a train during commuting hours, the client device 30 is connected to a mobile communication network and high speed and safe communication may not be anticipated; thus, the intermediate server device 20 disallows the transmission of the Web content and unilaterally causes the Web content not to be stored in the client device 30. In this case, the client device 30 may not receive the distribution of the Web content from the intermediate server device 20; however, when the user takes the client device 30 out of the house, since the Web content that the user is highly likely to view is stored, the user riding the train can view the Web content which is stored on the client device 30.

Note that, in the example described above, whether or not the client device 30 is left at home in the early morning, whether or not the client device 30 is moving together with the user riding on a train during commuting hours, and the like is exemplified as the predetermined transmission conditions; however, other transmission conditions may be used.

3. Flow of Client Device Processes

Next, description will be given of the flow of the processes executed by the client device 30 with reference to the flowcharts of FIGS. 8 and 9.

Web Content Reception Process

First, description will be given of the Web content reception process which is executed by the client device 30, with reference to the flowchart of FIG. 8.

Note that, the Web content reception process is executed when the Web content distribution process 1 of FIG. 4 is executed by the intermediate server device 20 and the Web content is transmitted to the client device 30. However, the client device 30 notifies the intermediate server device 20 of the contextual information as appropriate according to the contextual information notification process of FIG. 9 described later. Therefore, the Web content which is transferred by the intermediate server device 20 is the Web content that the user is highly likely to view according to the contextual information from the client device 30.

In step S301, according to the control from the control unit 301, the communication unit 302 receives the Web content transmitted from the intermediate server device 20.

In step S302, the control unit 301 stores the Web content which is received by the communication unit 302 on the recording medium 306.

In step S303, according to the control from the control unit 301, the Web browser 303 generates a tab for viewing the Web content which is recorded on the recording medium 306.

In step S304, the control unit 301 determines whether or not to display the Web content based on the operation signal from the operation unit 305. In step S304, for example, when the operation indicating the display of the Web content is performed by the user, the control unit 301 determines that the Web content will be displayed and the process proceeds to step S305.

In step S305, according to the control from the control unit 301, the Web browser 303 displays the Web content on the screen of the display unit 321 of the touch panel 304. For example, together with the User Interface (UI) of the Web browser 303, information such as news, weather forecasts and sports formed of text, images, or the like is displayed in the display region of the tab of the display unit 321. When the process of step S305 ends, the Web content reception process of FIG. 8 ends.

The Web content reception process is described above. In the Web content reception process, the Web content which is transmitted from the intermediate server device 20 is displayed at a predetermined timing. At this time, the Web content is subjected to a rendering process by the intermediate server device 20 (the process of step S104 of FIG. 4), and the tab of the Web browser 303 is also generated by the client device 30 (the process of step S303 of FIG. 8); thus, the Web content is in a state just prior to being displayed. Therefore, for example, when the user performs an operation indicating the display of the Web content, it is possible to cause the Web content to be swiftly displayed.

For example, in a mobile device such as a tablet terminal or a smart phone, the Central Processing Unit (CPU) or the memory is not sufficiently powerful, and when a mobile communication network is being used, the network bandwidth is not great; thus, when the Web content is prefetched in the background at the same time as the user is operating the Web browser, there is a likelihood the influence of the prefetching will cause the overall processing to be delayed and will impair the operation of the user. When the load is set to a minimum so as not to aversely influence the operation of the user, there is a likelihood that the prefetch process will not end before the user causes the Web content to be displayed. Therefore, the prefetch process is performed in the intermediate server device 20 which is provided in a position closer to the client device 30 in networking terms, and by performing at least a portion of the rendering process, the load on the client device 30 is reduced, and it is possible to display the Web content at approximately the same time as the operation of the user.

Figure 8:
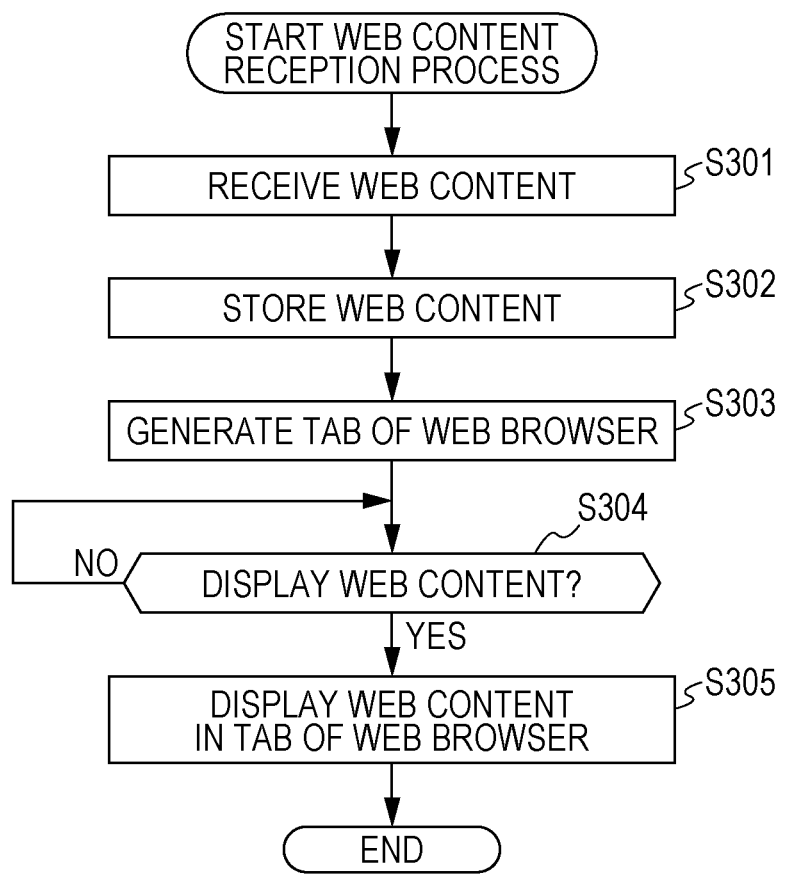
FIG. 8 is a flowchart illustrating a Web content reception process.
Figure 9:
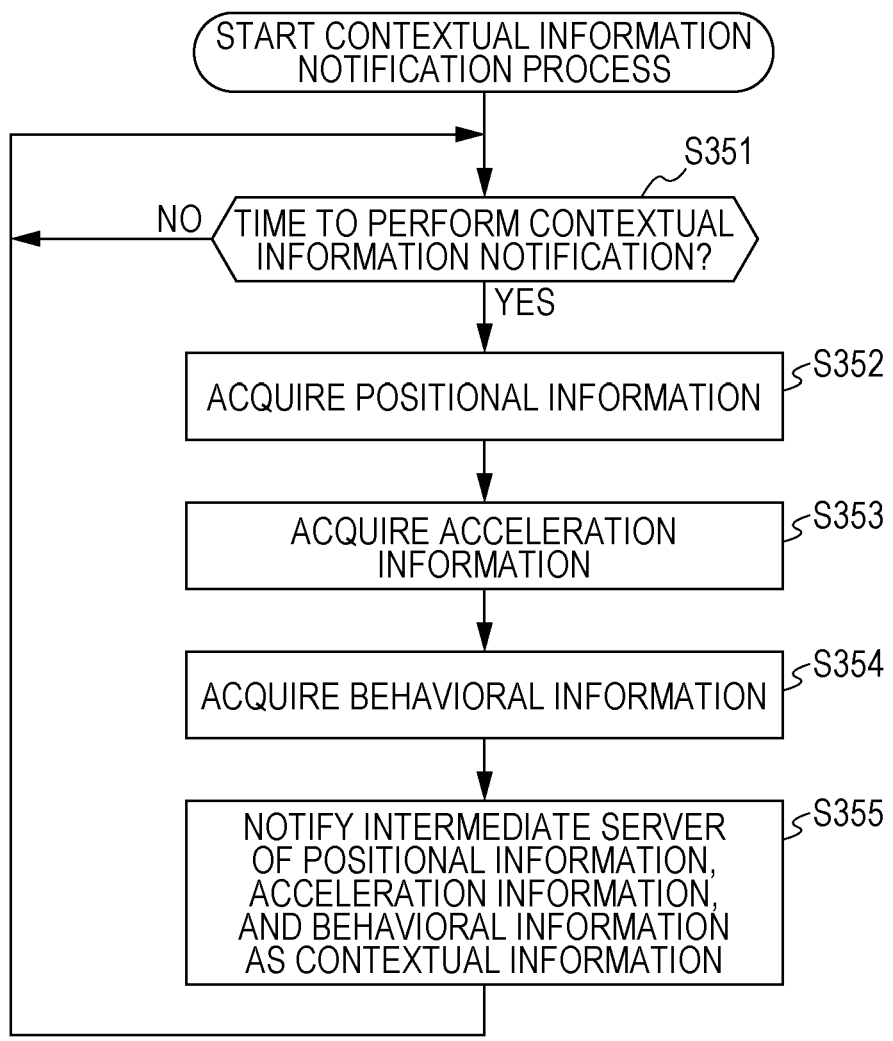
FIG. 9 is a flowchart illustrating a contextual information notification process.

Note that, for example, in the Web content reception process of FIG. 8, the processes of steps S301 to S303 are processes which are executed when the user is at home for example, and the Web content which is transmitted from the intermediate server device 20 using the wireless LAN or the like is stored in the client device 30. In contrast, the processes of steps S304 to S305 are processes which are executed when the user is riding in a train for example, and when the user performs an operation of causing the client device 30 to display the Web content stored therein, the Web content is displayed.

Contextual Information Notification Process

Next, description will be given of the contextual information notification process which is executed by the client device 30, with reference to the flowchart of FIG. 9.

In step S351, the control unit 301 determines whether or not it is time to perform the contextual information notification. In the determination process of step S351, the process waits for the time to perform the contextual information notification and then proceeds to step S352.

In step S352, according to the control from the control unit 301, the GPS unit 307 acquires the positional information indicating the present position of the client device 30 by receiving signals from GPS satellites (not shown).

In step S353, according to the control from the control unit 301, the accelerometer 308 acquires the acceleration information indicating the acceleration of the client device 30.

In step S354, using the positional information from the GPS unit 307 and the detection results from the various sensors, the control unit 301 performs a predetermined operation which predicts the behavior of the user in possession of the client device 30, and acquires the behavioral information obtained as a result of the operation.

In step S355, according to the control from the control unit 301, the communication unit 302 notifies the intermediate server device 20 of the positional information, the acceleration information, and the behavioral information as the contextual information via the network 90.

When the process of step S355 ends, the process returns to step S351 and the processes described above are repeated. Note that, in regard to the timing at which the notification of the contextual information is performed, a request for contextual information may be transmitted from the intermediate server device 20 to the client device 30, or the notification timing of the contextual information may be managed at the client device 30 side and the notification carried out at that timing.

Note that, here, an example is described in which notification of the positional information, the acceleration information, and the behavioral information is performed; however, the contextual information is not limited thereto, and in addition to the orientation information obtained from the detection results of the accelerometer 308 and the magnetometer 309, and the information which is obtained from the other sensors such as the rotational angle information from the gyroscope 310, the information indicating the date and time, the time of day, and the weekday may also be used as the contextual information in the notification.

The contextual information notification process is described above. In the contextual information notification process, the intermediate server device 20 is notified of the contextual information from the client device 30 at a predetermined timing.

4. Modification Example

Figure 10:
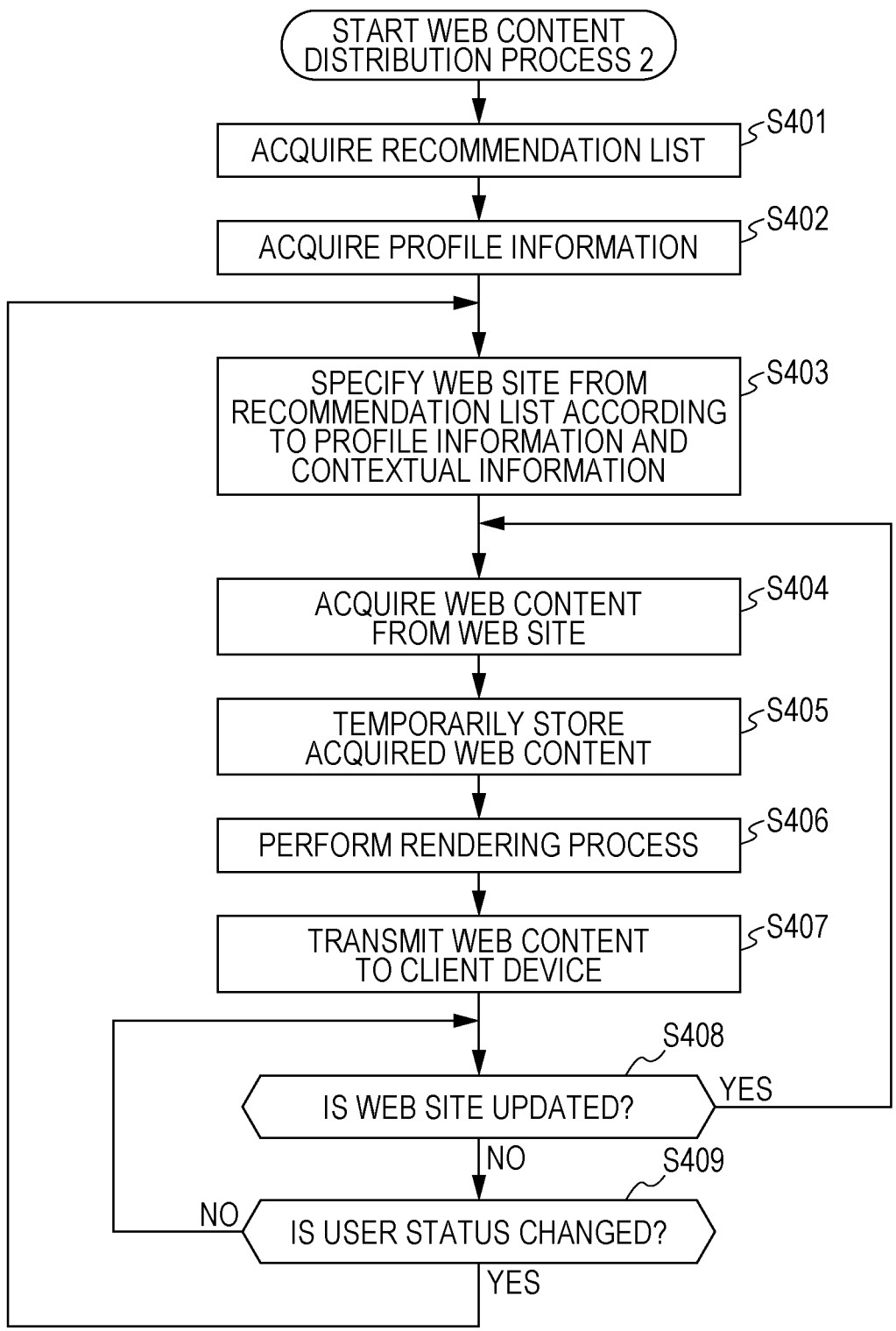
FIG. 10 is a flowchart illustrating Web content distribution process 2.
Figure 11:
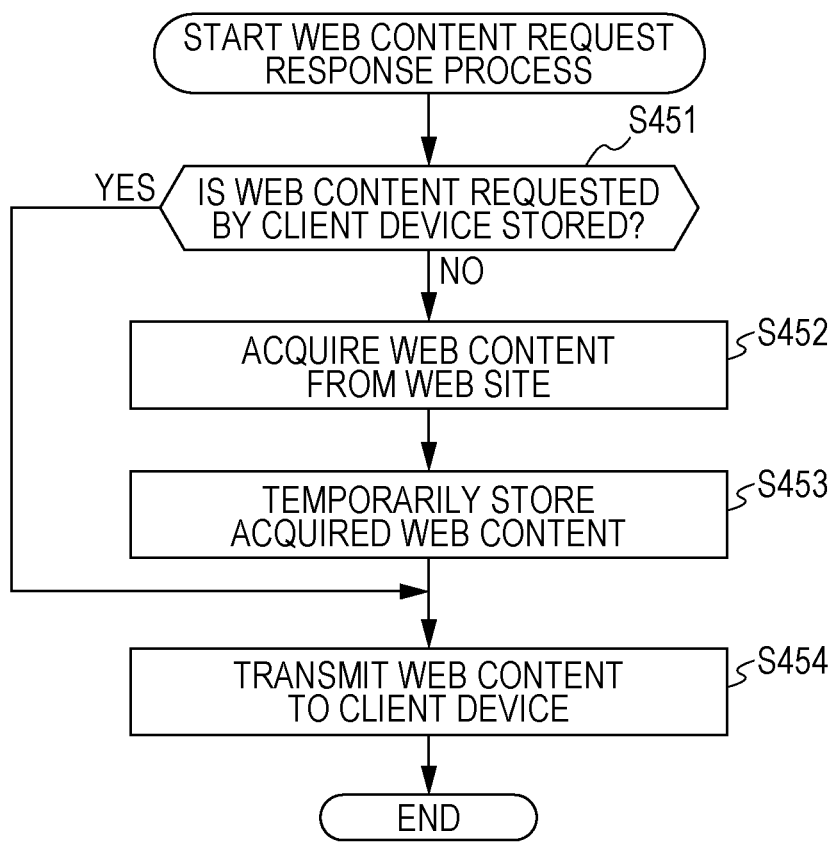
FIG. 11 is a flowchart illustrating a Web content request response process.

Next, description will be given of a modification example of the flow of the processes executed by the intermediate server device 20 with reference to the flowcharts of FIGS. 10 and 11.

Web Content Reception Process 2

First, description will be given of a Web content distribution process 2 which is executed by the intermediate server device 20, with reference to the flowchart of FIG. 10.

In step S401, the acquisition unit 204 controls the communication unit 203 to acquire a recommendation list of Web sites corresponding to the preferences of the user. For example, the recommendation list is acquired from a server device solely for managing the recommendation list.

In step S402, the acquisition unit 204 controls the communication unit 203 to acquire the profile information. The profile information includes information relating to the preferences and the behavioral history of the user such as Web sites often viewed, economics, science, baseball, and soccer, for example. For example, the profile information is acquired from the client device 30, the server device (not shown), and the like.

In step S403, the web site specification unit 205 specifies a Web site from the recommendation list according to the profile information and the contextual information. Here, by using the profile information in addition to the contextual information, it is possible to specify the Web site which provides information which the user is highly likely to view. For example, in the morning of a weekday, Web sites of specific economic news and the weather may be specified, in the afternoon on a holiday, a Web site relating to hobbies such as soccer may be specified, and if the user is outdoors in the afternoon of a weekday, a Web site with a map, the train timetable or the like may be specified.

In steps S404 to S409, in the same manner as in steps S102 to S107 of FIG. 4, the Web content which is specified in the process of S403 is acquired and temporarily stored, and the temporarily stored Web content is transmitted to the client device 30.

The Web content distribution process 2 is described above. In the Web content distribution process 2, the Web site is specified from the recommendation list according to the profile information and the contextual information, the Web content of the specified Web site is acquired and temporarily stored, and the temporarily stored Web content is transmitted to the client device 30.

Web Content Request Response Process

Next, description will be given of the Web content request response process which is executed by the intermediate server device 20, with reference to the flowchart of FIG. 11. Note that, the Web content request response process is executed when the request for the Web content is received from the client device 30.

In step S451, the control unit 201 determines whether or not the Web content which is requested by the client device 30 is stored in the temporary storage unit 202. In step S451, when the control unit 201 determines that the Web content which is requested by the client device 30 is not stored in the temporary storage unit 202, the process proceeds to step S452.

In step S452, the acquisition unit 204 controls the communication unit 203 to access the Web server device 10, which provides the Web site which is requested in the process of step S451, via the network 90, and acquires the Web content.

In step S453, according to the control from the control unit 201, the temporary storage unit 202 temporarily stores the Web content which is acquired by the acquisition unit 204.

In step S454, according to the control from the control unit 201, the communication unit 203 transmits the Web content that is acquired by the acquisition unit 204 to the client device 30 via the network 90. Accordingly, it is possible to return the Web content to the client device 30 that transmits the request for the Web content. Since the Web content is stored in the temporary storage unit 202, for example, when the same Web content is requested, it is possible to transmit the temporarily stored Web content to the client device 30.

Note that, in step S451, when the control unit 201 determines that the Web content which is requested by the client device 30 is stored in the temporary storage unit 202, the processes of steps S452 and S453 are skipped, and the process proceeds to step S454. In step S454, according to the control from the control unit 201, the communication unit 203 transmits the Web content that is stored in the temporary storage unit 202 to the client device 30 via the network 90. When the process of step S454 ends, the Web content request response process of FIG. 11 ends.

The Web content request response process is described above. In the Web content request response process, when the Web content that is requested by the client device 30 is not stored in the temporary storage unit 202, the Web content is acquired from the Web site that provides the Web content, stored in the temporary storage unit 202, and returned to the client device 30.

5. Specific Practical Example

Next, description will be given of a specific practical example using the communication system 1 of FIG. 1, with reference to FIG. 12.

Figure 12:
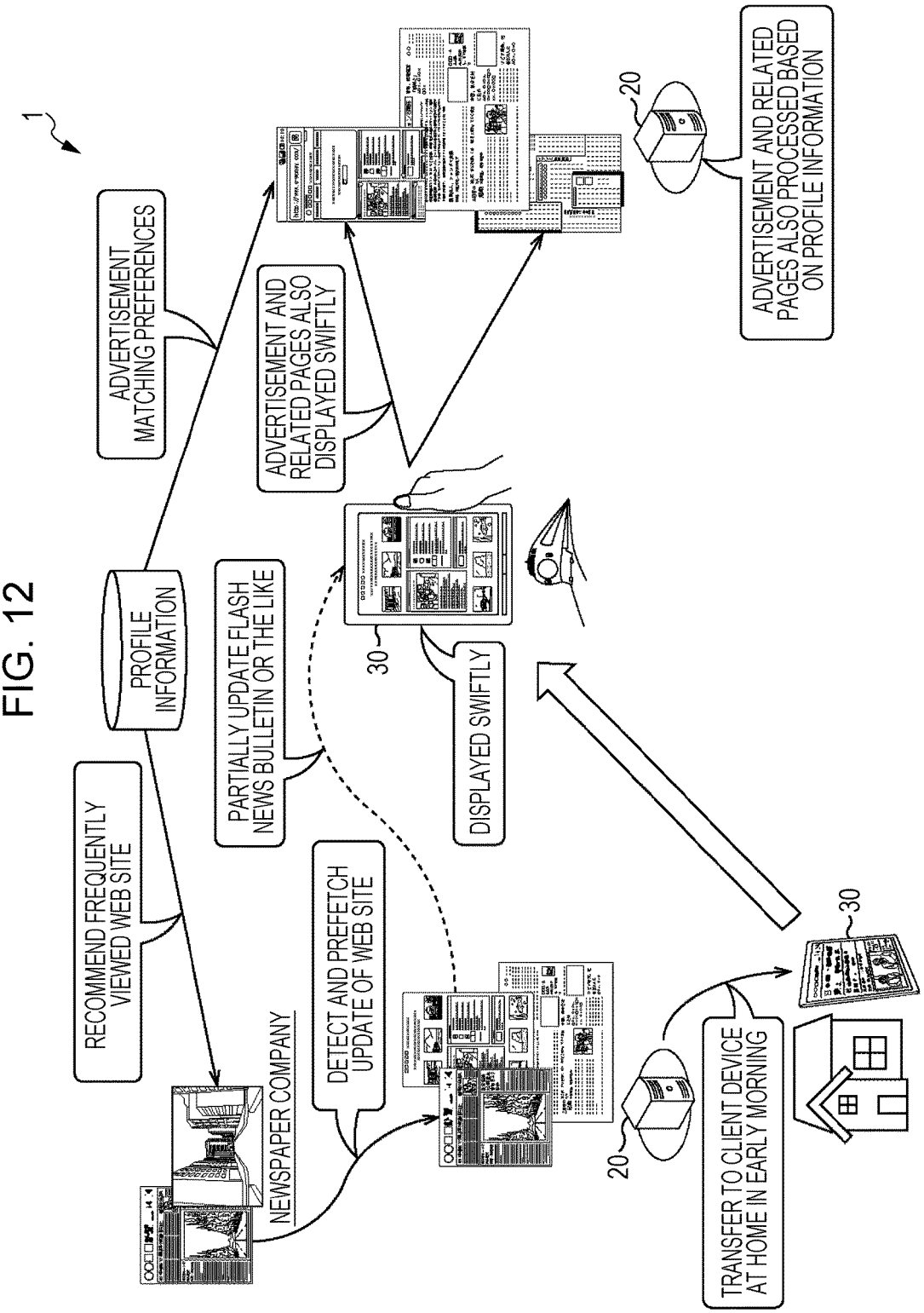
FIG. 12 is a diagram illustrating a specific practical example.

As illustrated in FIG. 12, the Web site of news and weather forecasts, which is provided by the Web server device 10 of the newspaper company, is a Web site that is recommended corresponding to the preferences of the user using the client device 30, and is normally updated frequently at a determined time of day such in the early morning. When the intermediate server device 20 detects that the Web site of news and weather forecasts is updated, the intermediate server device 20 loads the Web content of the Web site in advance and even performs the rendering process. Meanwhile, in the early morning, the user is typically at home. When a wireless LAN environment which is connected to a fixed communication network (for example, an optical communication network or the like) is set up at the home of the user, it is considered that the user will connect the client device 30 which the user possesses (for example, a tablet terminal or a smart phone) to the wireless LAN and use the connection thereof.

Therefore, the intermediate server device 20 loads the Web content in advance from the Web site in the early morning, performs the rendering process, and transfers the Web content to the client device 30 using the wireless LAN which is set up in the house of the user. Accordingly, for example, the Web content is stored in the client device 30 while the user is still sleeping, or while the user is preparing to go to work. However, the Web content depends on the contextual information of the client device 30 and the profile information indicating the preferences and the behavioral history of the user; thus, the Web content is that which the user is highly likely to view.

Subsequently, the user can view the Web content that is stored in the client device 30 from inside a train on the way to work, for example. At this time, it is considered that the client device 30 is connected to a mobile communication network; however, high speed and stable communication may not be easily anticipated inside a moving train. However, since the Web content that the user is highly likely to view is stored in advance in the client device 30 in the early morning, it is possible to load the Web content and cause the Web content to be displayed swiftly. At this time, by performing at least a portion of the rendering process at the intermediate server device 20 side, it is possible to reduce the load of the rendering process that is performed by the client device 30 and to increase the speed of the process.

Note that, even when the user is riding a train, when only a portion of the Web content such as a flash news bulletin is updated, since the load of the process is not significant, it is possible to perform the partial update process using communication that uses the mobile communication network, and to update the portion of the Web content that is displayed on the client device 30. In addition to the Web site of news or weather forecasts, related pages or advertisements related to the website can also be specified according to the contextual information and the profile information and be presented by the client device 30.

As described above, according to the present technology, since the Web content that the user is highly likely to use is loaded in advance according to the contextual information and the profile information by the intermediate server device 20 or the client device 30, it is possible to quickly present the desired Web content in the client device 30. For example, in a mobile device such as a tablet terminal or a smart phone, the Central Processing Unit (CPU) or the memory is not sufficiently powerful, and when a mobile communication network is being used, the network bandwidth is not great; however, even in this environment, it is possible to enable the stress-free viewing of the Web content that the user accesses on a daily basis.

Since the Web content that is loaded in advance corresponds to the contextual information and the profile information, it is anticipated that the prefetching hit rate will be increased. Therefore, the likelihood of the prefetched Web content being unnecessary traffic is extremely low, and it is possible to suppress damages such as wasteful communication costs when the prefetched Web content is unnecessary traffic. When the prefetching is performed based on fixed data such as bookmarks, the same Web content is typically displayed, and it is not necessarily possible to cater to the interests of the user; however, in the present technology, since the prefetching is performed using the contextual information and the profile information, this is not the case, and it is possible to present the Web content according to the interests of the user.

6. Configuration of Computer

The series of processes described above can be executed using hardware, and can be executed using software. When the series of processes is executed using software, the program configuring the software is installed on the computer. Here, the computer includes a computer embedded within dedicated hardware, and an ordinary personal computer or the like which is capable of executing the various functions due to having various programs installed thereon.

Figure 13:
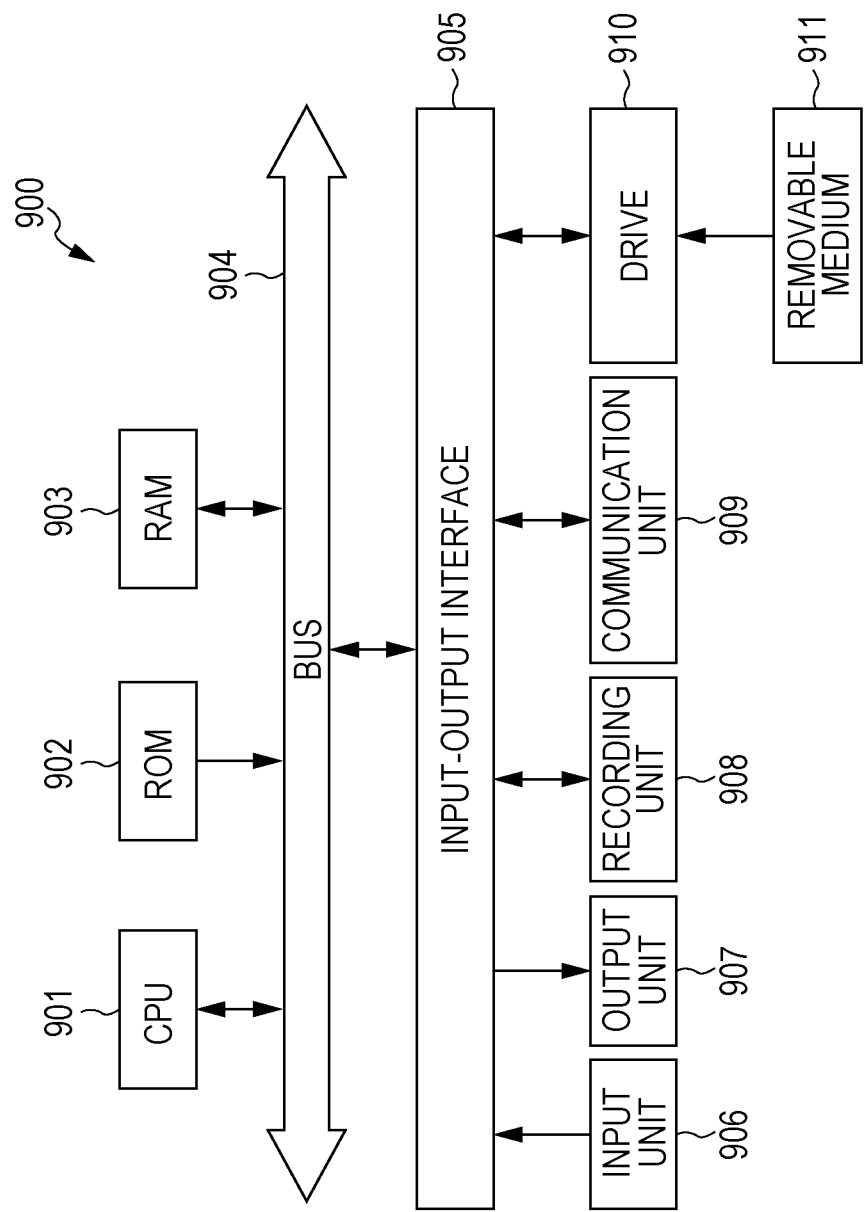
FIG. 13 is a diagram illustrating a configuration example of a computer.

FIG. 13 is a block diagram illustrating a configuration example of the hardware of the computer which executes the series of processes described above using a program.

In a computer 900, a CPU 901, Read Only Memory (ROM) 902, and Random Access Memory (RAM) 903 are connected to each other via a bus 904. An input-output interface 905 is also connected to the bus 904. The input-output interface 905 is connected to an input unit 906, an output unit 907, a recording unit 908, a communication unit 909, and a drive 910.

The input unit 906 is formed of a keyboard, a mouse, a microphone, and the like. The output unit 907 is formed of a display, a speaker, and the like. The recording unit 908 is formed of a hard disk, volatile memory, or the like. The communication unit 909 is formed of a network interface or the like. The drive 910 drives a removable medium 911 such as a magnetic disk, an optical disc, a magneto-optical disc or semiconductor memory.

In the computer 900 which is configured as described above, the series of processes described above are performed by the CPU 901, for example, loading the program stored in the recording unit 908 into the RAM 903 via the input-output interface 905 and the bus 904, and executing the loaded program.

The program executed by the computer 900 (the CPU 901), for example, may be provided by recording the program onto the removable medium 911 as a packaged medium or the like. It is possible to provide the program via a wired or wireless transmission medium such as a local area network, the Internet, or a digital satellite broadcast.

In the computer 900, it is possible to install the program onto the recording unit 908 via the input-output interface 905 by mounting the removable medium 911 into the drive 910. It is possible to install the program onto the recording unit 908 by receiving the program using the communication unit 909 via a wired or wireless transmission medium. Additionally, it is possible to install the program beforehand on the ROM 902 or the recording unit 908.

Note that, the program which the computer 900 executes may be a program in which the processes are performed in time series order in the order described in the present specification. The program may be a program in which the processes are performed in parallel or at the necessary timing such as when the process is called.

Here, in the present specification, it is not necessary that the process steps denoting the program for causing the computer 900 to perform the various processes be processed in time series order in the order described as flowcharts, and includes processes to be executed in parallel or individually (for example, parallel processing or object oriented processing).

The program may be processed by one computer, and may be processed in a distributed manner by a plurality of computers. The program may be transferred to a distant computer and executed. The term "system" in the present specification refers to an assembly of a plurality of components (apparatuses, modules (parts) and the like), and it is not an issue as to whether or not all of the components are contained within the same housing. Therefore, a plurality of apparatuses which are stored in separate housings and connected via a network, and a single apparatus in which a plurality of modules are stored within a single housing are both systems.

Note that, the embodiments of the present technology are not limited to the embodiment described above, and various modifications may be made within the scope not departing from the spirit of the present technology. For example, in the present technology, it is possible to adopt a cloud computing configuration in which one function is distributed, shared and processed by a plurality of devices via a network.

In addition to executing each of the steps described in the flowcharts described above using one device, it is possible to distribute and execute the steps over a plurality of devices. In a case in which a plurality of processes are contained in one step, in addition to executing the processes on one device, it is possible to distribute and execute the plurality of processes contained in that one step on a plurality of devices.

Note that, the present technology may adopt the following configurations.

(1) A server device includes an acquisition unit which acquires contextual information of a client device; a Web site specification unit which specifies a Web site according to the contextual information; a temporary storage unit which temporarily stores Web content that is acquired from the Web site; a communication unit which transmits the Web content that is stored in the temporary storage unit to the client device; and a control unit which controls operations of the entire server device.

(2) In the server device according to (1), when the control unit identifies that the client device is moving according to the contextual information, the control unit disallows transmission of the Web content to the client device by the communication unit.

(3) In the server device according to (2), the contextual information includes at least one of positional information indicating a position of the client device, acceleration information indicating acceleration of the client device, and behavioral information indicating behavior of a user in possession of the client device.

(4) In the server device according to any one of (1) to (3), the contextual information includes at least information indicating one of date and time, time of day, and weekday.

(5) In the server device according to any one of (1) to (4), the acquisition unit acquires a recommendation list of Web sites corresponding to preferences of a user in advance, and the web site specification unit specifies the Web sites from the recommendation list according to a user profile.

(6) In the server device according to any one of (1) to (5), the control unit controls the server device such that, when the Web content that is requested by the client device is not stored in the temporary storage unit, the Web content is acquired from the Web site that provides the Web content, stored in the temporary storage unit, and returned to the client device via the communication unit.

(7) The server device according to any one of (1) to (6), the control unit renders the Web content that is stored in the temporary storage unit, and the communication unit transmits results of the rendering to the client device.

(8) The server device according to any one of (1) to (7), the control unit controls the server device such that, when updated information of the Web site is received from the Web server device via the communication unit, the Web content of the Web site is acquired, compared with the Web content stored in the temporary storage unit, and only an updated portion of the Web content is transmitted to the client device.

(9) In the server device according to any one of (1) to (8), link information indicating a location at which the Web content is stored is arranged by the user in the temporary storage unit, and, when the Web content which is provided by the Web site which is specified according to the contextual information of a predetermined user is already stored in the temporary storage unit, the control unit does not acquire the Web content from the Web site, and causes the temporary storage unit to store the link information, associated with the user, indicating the storage location at which the Web content is stored.

(10) An information processing method of a server device includes causing the server device to acquire contextual information of a client device, specify a Web site according to the contextual information, temporarily store Web content that is acquired from the Web site in a temporary storage unit, and transmit the Web content that is stored in the temporary storage unit to the client device.

It should be understood by those skilled in the art that various modifications, combinations, sub-combinations and alterations may occur depending on design requirements and other factors insofar as they are within the scope of the appended claims or the equivalents thereof.

What is claimed is:

1. A first server device, comprising:
   at least one processor configured to:
      acquire a status of a client device from a plurality of sensor devices associated with the client device;
      acquire from a second server device, a recommendation list of a plurality of Web sites corresponding to preferences of a user;
      identify, based on the status of the client device, that the client device is in motion;
      specify a first Web site from the plurality of Web sites based on the status of the client device, wherein the plurality of Web sites is specify from the recommendation list;
      temporarily store first Web content acquired from the first Web site in a storage device;
      transmit the first Web content stored in the storage device to the client device based on the identification of motion of the client device; and
      prohibit the transmission of the first Web content to the client device based on a change in the status of the client device.

2. The first server device according to claim 1,
wherein the status of the client device includes at least one of positional information indicating a position of the client device, acceleration information indicating acceleration of the client device, or behavioral information indicating behavior of the user in possession of the client device.

3. The first server device according to claim 1,
wherein the status of the client device includes information indicating at least one of date, time of day, or weekday.

4. The first server device according to claim 1,
wherein the recommendation list is based on a profile of the user and the status of the client device.

5. The first server device according to claim 1,
wherein the at least one processor is further configured to:
determine a storage status of the first Web content requested by the client device, in the storage device; and
acquire the first Web content from the first Web site based on a lack of storage of the first Web content in the storage device;
temporarily store the acquired first Web content in the storage device; and
transmit the acquired first Web content to the client device.

6. The first server device according to claim 1,
wherein the at least one processor is further configured to:
render the first Web content stored in the storage device; and
transmit the rendered first Web content to the client device.

7. The first server device according to claim 1,
wherein the at least one processor is further configured to:
acquire a second Web content of the first Web site received from a third server,
wherein the second Web content is at least a newly acquired Web content or an updated Web content;
compare the acquired second Web content with the first Web content stored in the storage device; and
transmit at least the newly acquired Web content or an updated portion of the updated Web content, to the client device based on the comparison.

8. The first server device according to claim 1,
wherein the storage device includes link information indicating a storage location of the stored first Web content; and
wherein, based on the first Web content which is provided by the first Web site specified based on the status of the client device, the at least one processor is further configured to:
ignore the acquisition of the first Web content from the first Web site; and
store the link information in the storage device, by the storage device, wherein the link information is associated with the user.

9. An information processing method, comprising:
in a server device:
acquiring a status of a client device from a plurality of sensor devices associated with the client device;
acquiring from a second server device, a recommendation list of a plurality of Web sites corresponding to preferences of a user;
identifying, based on the status of the client device, that the client device is in motion;
specifying a first Web site form the plurality of Web sites based on the status of the client device, wherein the plurality of Web sites is specify from the recommendation list;
temporarily storing first Web content acquired from the first Web site in a storage device;
transmitting the first Web content stored in the storage device to the client device based on the identification of motion of the client device; and
prohibiting the transmission of the first Web content to the client device based on change in the status of the client device.

* * * * *